United States Patent [19]

Ahuja

[11] 4,384,323
[45] May 17, 1983

[54] STORE GROUP BUS ALLOCATION SYSTEM

[75] Inventor: Sudhir R. Ahuja, Aberdeen, N.J.

[73] Assignee: Bell Telephone Laboratories, Incorporated, Murray Hill, N.J.

[21] Appl. No.: 124,426

[22] Filed: Feb. 25, 1980

[51] Int. Cl.³ .............................................. G06F 9/18
[52] U.S. Cl. .................................................. 364/200
[58] Field of Search ... 364/200 MS File, 900 MS File; 340/147 LP

[56] References Cited

U.S. PATENT DOCUMENTS

| | | | |
|---|---|---|---|
| 3,445,822 | 5/1969 | Driscoll | 364/200 |
| 3,496,551 | 2/1970 | Driscoll | 364/200 |
| 3,818,447 | 6/1974 | Craft | 340/147 LP |
| 3,866,181 | 2/1975 | Gayman et al. | 364/200 |
| 3,978,451 | 8/1976 | Ito et al. | 340/147 LP |
| 4,016,539 | 4/1977 | Nanya | 340/147 LP |
| 4,047,161 | 9/1977 | Davis | 364/200 |
| 4,115,851 | 9/1978 | Nagano et al. | 364/200 |
| 4,123,794 | 10/1978 | Matsumoto | 364/200 |
| 4,148,011 | 4/1979 | McLagan et al. | 340/147 LP |
| 4,177,513 | 12/1979 | Hoffman et al. | 364/200 |

*Primary Examiner*—Gareth D. Shaw
*Assistant Examiner*—John G. Mills
*Attorney, Agent, or Firm*—Gregory C. Ranieri

[57] ABSTRACT

Store group circuits (102a,b,c or 202a,b,c) in fixed priority bus allocation arrangements eliminate lockouts and reduce delays for devices (101a,b,c) requesting access to a shared resource such as a data bus. The store group circuit stores (111 or 205-1 through 205-3) all access requests (REQA, REQB, REQC) from the devices present at a time instant, inhibits (110 or 210) storage of subsequent requests until each device associated with a stored request is granted access (GRANTA, GRANTB, GRANTC), and removes from storage each request associated with a device which has been granted access. Arbitration is performed among the stored requests using existing arbiters (103) in the fixed priority bus allocation arrangement. Bus access is guaranteed for devices whose requests are stored in the store group circuit thereby eliminating lockouts.

1 Claim, 2 Drawing Figures

STORE GROUP BUS ALLOCATION SYSTEM

TECHNICAL FIELD

This invention relates to shared resource allocation systems and, more specifically, to bus allocation arrangements for storing a group of bus access requests which are present at a time instant.

BACKGROUND OF THE INVENTION

Systems in which many devices share a common resource, such as a data bus, utilize bus allocation arrangements for systematically controlling device access to the data bus. According to the type of bus allocation arrangement being used, certain devices are granted bus access on a preferred basis over other devices regardless of the order in which the devices requested access. Devices requesting bus access but not receiving preferential bus allocation treatment experience delays in gaining bus access. In certain situations, the delay can increase to such an extent that a device is effectively denied access to the data bus. This situation is commonly known as a lockout.

In a fixed priority bus allocation arrangement, each device is assigned a permanent priority. In such arrangements, an arbiter applies a predetermined arbitration rule to resolve contentions among several devices simultaneously requesting bus access. Application of one such rule causes contentions to be resolved in favor of a device whose fixed priority is higher than the fixed priorities of other contending devices. By repeated application of this arbitration rule, the arbiter clearly exhibits a preference for high priority devices. Therefore, long delays in obtaining bus access are common for low priority devices simultaneously contending for bus access with high priority devices. Consequently, the arbiter contributes to causing lockouts by increasing the delay from bus request to bus access.

One common situation in which the arbiter, applying the arbitration rule described above, causes lockouts is when two high priority devices alternate in contending for bus access simultaneously with a lower priority device. Contentions between either one of the two high priority devices and the lower priority device are never resolved in favor of the lower priority device. Thus, the lower priority device is locked out from access to the data bus.

SUMMARY OF THE INVENTION

Lockout of devices contending for bus access is eliminated in fixed priority bus allocation systems, in accordance with an aspect of the invention, by storing all bus access requests from the devices present at a time instant, inhibiting storage of subsequent requests until each device associated with a stored request is granted bus access, and removing from storage each request associated with a device which has been granted bus access. Arbitration is performed among the stored requests.

For one embodiment of the invention, the stored bus access request signals constitute a store group and are stored in memory elements of store group circuits. After formation of the store group, subsequent request signals are prevented from entering the store group by a disabled transmission gate. Request signals in the store group are supplied to an arbiter to resolve contentions for bus access. When bus access is granted to a particular device, the request signal associated with the particular device is removed from the store group by clearing that request signal from the particular memory element of the store group circuit. This process is repeated until all request signals in the store group have been cleared from their respective memory elements and, thus, from the store group. Thus, bus access is guaranteed for devices whose request signals are stored in the store group and lockouts are eliminated. Furthermore, delays from the time a bus access request is initiated until the time bus access is granted are no greater than a predetermined maximum interval.

In another embodiment of the invention, multiple store groups are available to a request signal from each device. Each store group is formed, according to this aspect of the invention, at a distinct time instant. Multiple store groups allow request signals occurring just after formation of a first store group to be stored in a second store group. The first store group must be empty before bus access is granted to a device whose request signal is stored in the second store group and so on.

In a bus allocation arrangement utilizing multiple store groups, lockouts are eliminated because only request signals in a particular store group are allowed to contend for bus access. Also, as the number of available store groups increases, the amount of time a device must wait until its request signal is placed in a store group is minimized. In most situations involving the multiple store group bus allocation arrangement, only devices whose requests are not currently stored in a store group can be placed in an empty store group. This limits the number of devices requesting bus access at any given time and reduces the time a device must wait for bus access.

BRIEF DESCRIPTION OF THE DRAWING

A more complete understanding of the invention may be obtained by reading the following detailed description of specific illustrative embodiments of the invention in conjunction with the appended drawing in which.

DETAILED DESCRIPTION

Figure 1:
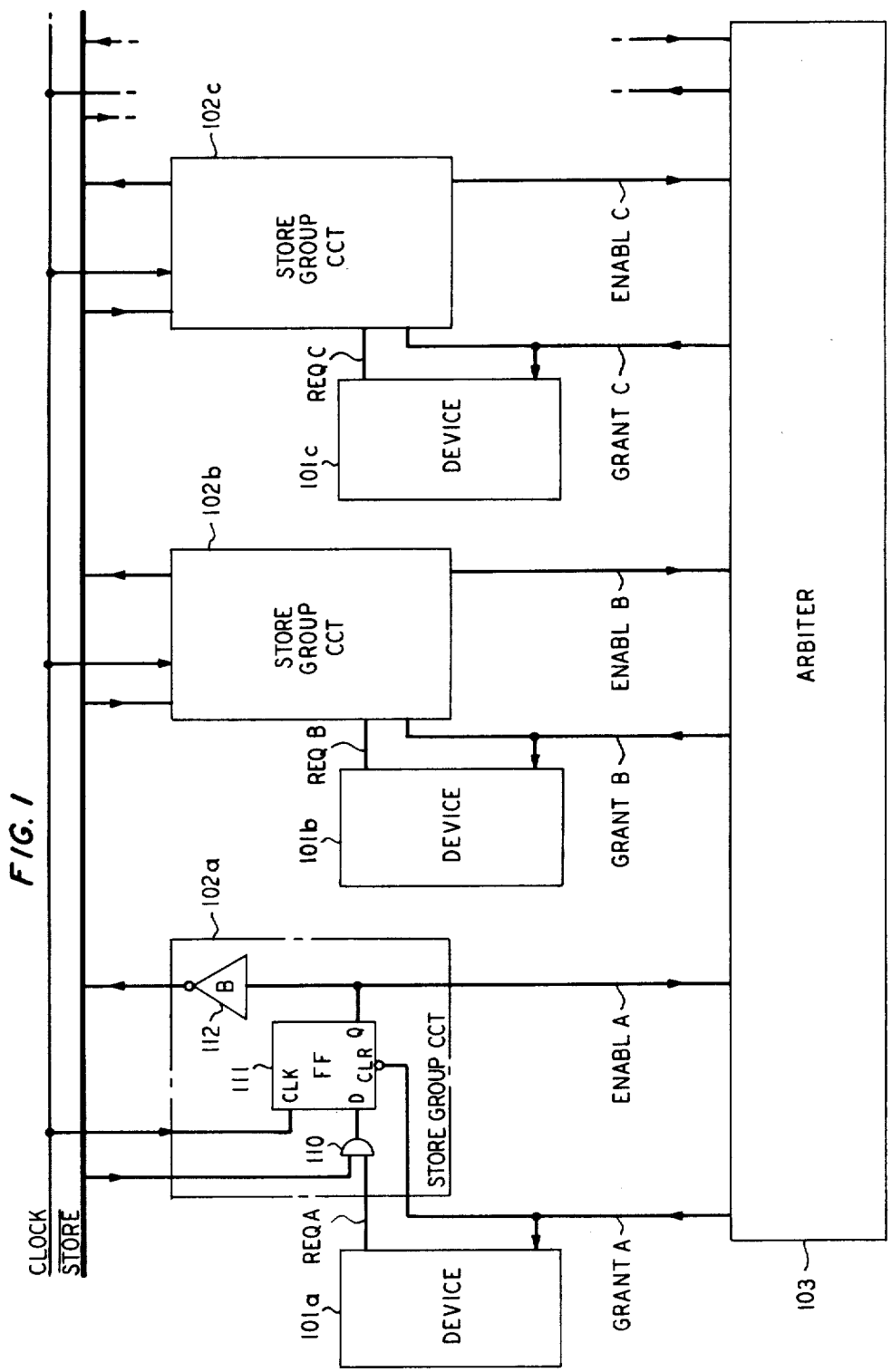
FIG. 1 shows a simplified block diagram of a minimum store group bus allocation arrangement.
Figure 2:
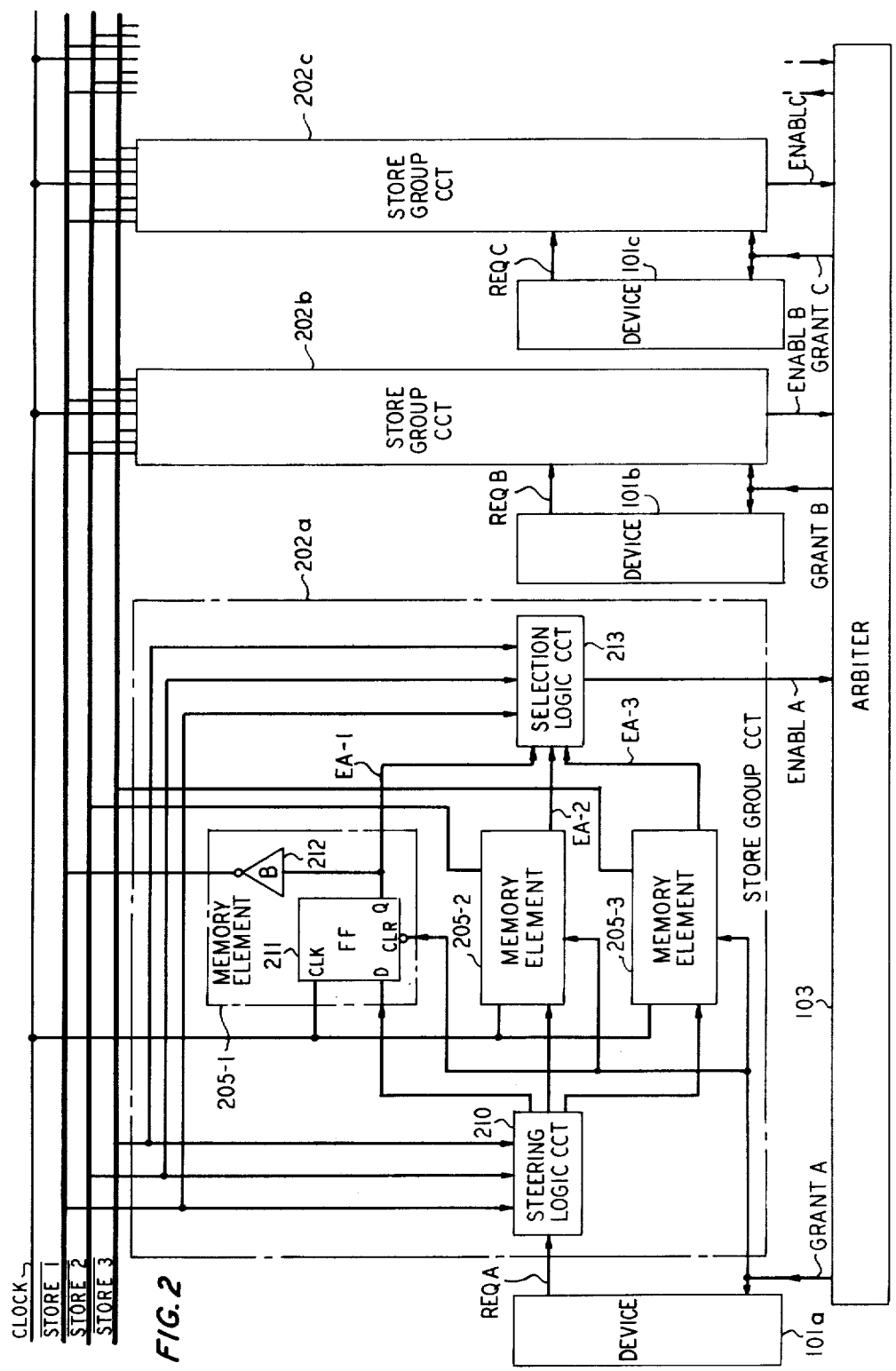
FIG. 2 shows a simplified block diagram of a multiple store group bus allocation arrangement utilizing three store groups.

FIGS. 1 and 2 are simplified block diagrams of store group bus allocation arrangements. A data bus (not shown in either FIG. 1 or FIG. 2) is used in experimental practice to provide a common communication path among devices 101a, 101b and 101c. Devices 101a, b and c utilized in experimental practice are of the type including processors, memories, data terminals and the like. Three devices have been shown only for purposes of illustration. Although only three devices have been shown in each of FIGS. 1 and 2, the store group bus allocation arrangements are modularly configured to accept any desired number of devices, provided that the number is at least two.

Store group bus allocation arrangements are adapted for use with existing arbiters in the fixed priority bus allocation arrangement. Although the arbiter alone tends to give preferential treatment to certain devices which may lead to lockouts, the store group bus allocation arrangement operates in combination with the arbiter to limit the effect of the preferential treatment only to those devices whose requests are in a store group.

As shown in FIG. 1, a minimum store group bus allocation arrangement includes devices 101a, b, and c, store group circuits 102a, 102b and 102c associated on a one-to-one basis with respective devices 101a, b and c, arbiter 103 and several common signals, CLOCK and $\overline{\text{STORE}}$, on paths between each of store group circuits 102a, b and c. Store group circuits 102b and c, although not shown in detail, are the same as and operate in identical fashion to store group circuit 102a. Details of store group circuit 102a are described below.

Each of devices 101a, b and c is assigned a fixed priority, e.g., device 101a has a higher priority than device 101b which has a higher priority than device 101c. When devices 101a, b and c seek access to the data bus, they generate high level signals REQA, REQB and REQC, respectively, which are supplied to store group circuits 102a, b and c, respectively. Signal REQA, as well as other signals shown in FIGS. 1 and 2, are binary signals. That is, each signal may be at one of two possible levels at a given time: a high level representing a logical '1' or a low level representing a logical '0'.

Store group circuits 102a, b or c respond to high level bus access request signals REQA, REQB or REQC, respectively, being present at a given time instant to continuously generate high level arbitration enabling signals ENABLA, ENABLB or ENABLC, during a time interval ending when each of the devices requesting bus access is granted access by arbiter 103. While at least one arbitration enabling signal is being generated at the high level, any bus access request signal then generated is prevented from entering its associated store group circuit. Thus, each device whose bus access request signal entered a store group circuit is guaranteed access to the data bus and the possibility of lockouts is eliminated.

Arbiter 103 grants bus access to one of the contending devices according to a prescribed criterion based upon fixed priorities assigned to each contending device. As discussed above, an arbitration criterion used in experimental practice resolves contentions in favor of the device whose priority is higher than the priorities of the other contending devices. The device in whose favor the contention is resolved and the associated store group circuit receive a high level grant signal, such as GRANTA, GRANTB or GRANTC, allowing bus access. An example of arbiter 103 used in experimental practice is an SBI Control module in a VAX-11/780 computer described in "Translation Buffer, Cache and SBI Control Technical Description (VAX-11/780 Implementation)", (Digital Equipment Corporation, 1978). In this reference, the arbitration enabling signals are labelled TR and the grant signals are labelled TRANSENABLE L.

Store group circuit 102a determines whether request signal REQA from device 101a may be placed in an available store group to contend for bus access in arbiter 103. This serves as a means for controlling access of device 101a to the data bus. Store group circuit 102a includes AND gate 110, which controls transmission of request signal REQA, D flip-flop 111, which is a memory element, and buffer 112. Since store group circuit 102a and the other group circuits contain only one memory element each, a minimum number of store groups, i.e., one, exists at any given time. In view of this, the bus allocation arrangement is known as the minimum store group bus allocation system.

Bus access request signals stored at the same time instant constitute a store group. When no request signals are stored in any of store group circuits 102a, b or c, the store group is empty and signal $\overline{\text{STORE}}$ exhibits a high level which is characteristic of an idle store group state. AND gate 110 is enabled by signal $\overline{\text{STORE}}$ to transmit or steer signal REQA to an input D of flip-flop 111.

High level signal REQA, supplied via AND gate 110 to the D input of flip-flop 111, is stored in flip-flop 111 at a time instant when signal CLOCK (input CLK of D flip-flop 111) makes a transition to a high level. In turn, flip-flop 111 generates high level arbitration enabling signal ENABLA at output Q for a time interval which terminates when flip-flop 111 is cleared. Flip-flop 111 provides memory for store group circuit 102a. Collectively, flip-flop 111 and its counterparts in store group circuits 102b and c indicate which of request signals REQA, REQB or REQC are in a particular store group.

Signal ENABLA via inverting buffer 112 causes a transition of signal $\overline{\text{STORE}}$ to a low level which is characteristic of an active store group state. In experimental practice, buffer 112 is an open collector whose output is wire-OR'ed to the outputs of identical buffers (not shown) in store group circuits 102b and c inverting buffer. Signal $\overline{\text{STORE}}$, now at a low level, inhibits transmission of signal REQA to flip-flop 111 by disabling AND gate 110 until signal $\overline{\text{STORE}}$ is again set to a high level. Signal ENABLA is also supplied to arbiter 103. A high level ENABLA signal indicates to arbiter 103 that device 101a is contending for bus access.

In the example, device 101a alone is contending for access as exhibited by signal REQA being the only request signal in the store group and signal ENABLA being a high level. In response to signal ENABLA, arbiter 103 grants bus access by generating a high level GRANTA signal and transmitting it to device 101a and to input CLR (clear) of flip-flop 111. This, in turn, causes a low level to appear at output Q of flip-flop 111. Signal ENABLA, presently at a low level, via inverting buffer 112 allows signal $\overline{\text{STORE}}$ to return to a high level indicating that the store group is empty. The minimum store group bus allocation arrangement is again prepared to form a new store group.

In another example from experimental practice, devices 101a and c seek access to the bus and generate respective request signals REQA and REQC which combine in store group circuits 102a and c, respectively, to form the new store group. As described above, device 101a, has a higher priority than device 101c and is granted bus access by arbiter 103. Signal REQA is cleared from the store group. Signal $\overline{\text{STORE}}$ remains at a low level because signal ENABLC, at a high level, is applied via an inverting buffer (not shown) in store group circuit 102c.

In the present example, if either signal REQA or signal REQB is generated, both are denied entry to the store group because signal $\overline{\text{STORE}}$ is low. Thus, device 101c is guaranteed bus access before any other device, regardless of priority, whose request signal is not already in the store group. Device 101c cannot be locked out from bus access because signal REQC is in the store group. After device 101c is granted bus access by arbiter 103 and signal $\overline{\text{REQC}}$ is cleared from store group circuit 102c, signal $\overline{\text{STORE}}$ returns to a high level.

While signal $\overline{\text{STORE}}$ is low, request signals which are generated subsequent to formation of a store group are prevented from entering a current store group. Moreover, in accordance with an aspect of the invention, signal $\overline{\text{STORE}}$ is held low until each device, whose request signal is in the current store group, is granted access to the bus. Thus, each device having a request signal in the current store group is guaranteed bus access before any device, regardless of priority, that requests bus access subsequent to formation of the current store group.

FIG. 2 is a simplified block diagram of a multiple store group bus allocation arrangement using three separate store groups. Multiple store group bus allocation arrangements permit a request signal which occurs subsequent to the formation of one store group to be stored in another store group which is formed at a later time instant.

The multiple store group bus allocation arrangement shown in FIG. 2 includes devices 101a, 101b and 101c, store group circuits 202a, 202b and 202c, arbiter 103 and several common signals, CLOCK, $\overline{\text{STORE1}}$, $\overline{\text{STORE2}}$ and $\overline{\text{STORE3}}$, on paths between each of store group circuits 202a, b and c. Devices 101a, b and c utilized in experimental practice are of the type including processors, memories, data terminals and the like. Three devices have been shown only for purposes of illustration. Although only three devices have been shown in FIG. 2, the multiple store group bus allocation arrangement is modularly configured to accept any desired number of devices, provided that the number is at least two. Devices 101a, b and c and arbiter 103 are identical to those employed in the embodiment of FIG. 1 and operate as described above. Store group circuits 202b and c, although not shown in detail, are the same as and operate identically to store group circuit 202a. Details of store group circuit 202a are described below.

Store group circuit 202a steers a high level request signal from device 101a to one of several store groups based on certain conditions at the time request signal REQA occurs. Furthermore, store group circuit 202a selects one active store group for arbitration at a particular time.

Store group circuit 202a includes steering logic circuit 210, memory elements 205-1 through 205-3, and selection logic circuit 213. Since there are three memory elements in each store group circuit, there are three possible store groups in the multiple store group bus allocation arrangement illustrated in FIG. 2. Each of memory elements 205-2 and 205-3 is identical to memory element 205-1. Memory element 205-1 includes D flip-flop 211 and inverting buffer 212.

Steering logic circuit 210 responds to signals $\overline{\text{STORE1}}$, $\overline{\text{STORE2}}$ and $\overline{\text{STORE3}}$ to determine whether request signal REQA is to be transmitted, if at all, to one of memory elements 205-1 through 205-3. Memory elements 205-1 and corresponding memory elements in store group circuits 202b and c comprise a first store group. Memory elements 205-2 and 205-3 and their respective corresponding memory elements in store group circuits 202b and c comprise second and third store groups, respectively.

In an example from experimental practice, steering logic circuit 210 includes a multiple input priority encoder responsive to at least signals $\overline{\text{STORE1}}$, $\overline{\text{STORE2}}$ and $\overline{\text{STORE3}}$ or their complementary representations and a multichannel demultiplexer responsive to the encoder output for steering signal REQA to one of memory elements 205-1 through 205-3. Such encoders and demultiplexers are commercially available and well known to those skilled in the art. See, for example, RCA COS/MOS Integrated Circuits DATABOOK (SSD-203C, 1974). For signals $\overline{\text{STORE1}}$, $\overline{\text{STORE2}}$, and $\overline{\text{STORE3}}$ all at high level, signal REQA is transmitted via steering logic circuit 210 to memory element 205-1, a memory element in the first store group. For only signal $\overline{\text{STORE1}}$ at a low level, signal REQA is transmitted via steering logic circuit 210 to memory element 205-2, a memory element in the second store group. With signal $\overline{\text{STORE2}}$ at a low level and signal $\overline{\text{STORE3}}$ high, signal REQA is transmitted via steering logic circuit 210 to memory element 205-3, a memory element in the third store group. IF signal $\overline{\text{STORE3}}$ is at a low level, signal REQA is inhibited by steering logic circuit 210 from being transmitted to any of memory elements 205-1 through 3. The above described operation of steering logic circuit 210 is only intended to be an example from experimental practice. Other embodiments and methods of operation for steering logic circuit 210 will be apparent to those skilled in the art.

After high level signal REQA arrives at a memory element, for example, at memory element 205-1, via steering logic circuit 210, signal REQA is stored in flip-flop 211 when signal CLOCK makes a transition to a high level. At that time instant, signal EA-1 at output Q changes to a high level. Signal EA-1 remains high during a continuous time interval until a high level GRANTA signal causes output Q of flip-flop 211 to be reset to a low level.

The high level EA-1 signal via inverting buffer 212 causes signal $\overline{\text{STORE1}}$ to be pulled down to a low level indicating that the first store group is active. Also, signal EA-1 is supplied to selection logic circuit 213 along with signals EA-2 and EA-3 both of which are low in this example.

Now that the first store group is active, a request signal, say signal REQB, occurring after formation of the first store group is placed in the second store group. An appropriate signal from the second memory element (not shown) in store group circuit 202b causes signal $\overline{\text{STORE2}}$ to be at a low level.

Selection logic circuit 213 monitors signals $\overline{\text{STORE1}}$, $\overline{\text{STORE2}}$, and $\overline{\text{STORE3}}$ to determine which memory element output signal EA-1, EA-2 or EA-3, from an active store group, is to be transmitted to arbiter 103. Based upon the determination reached by selection logic circuit 213, arbitration enabling signal ENABLA is supplied by selection logic circuit 213 to arbiter 103. In an example from experimental practice, selection logic circuit 213 includes a multiple input priority encoder responsive to at least signals $\overline{\text{STORE1}}$, $\overline{\text{STORE2}}$ and $\overline{\text{STORE3}}$ or their complementary representations and a multichannel multiplexer responsive to the encoder output for selecting one memory element output signal to be transmitted to arbiter 103. The multiplexer is commercially available and well known to those skilled in the art. See, for example, the above-mentioned RCA DATABOOK reference. Selection logic circuit 213 and its counterpart in store group circuits 202b and c require that arbitration of all requests in the first store group, e.g., memory element 205-1 and its counterparts in store group circuits 202b and c, be completed before arbitration of requests in the second store group commences. That is, during the time interval when the first store group is active, selection logic circuit 213 chooses signal EA-1 for transmission to arbiter 103. Signal EA-2 is not chosen until the second store group is active and the first store group becomes idle i.e., signal $\overline{STORE1}$ returns to a high level.

One or more request signals occurring after the first and second store groups are formed enter the third store group. Then, subsequent request signals are then prevented from entering a store group because signals $\overline{STORE1}$, $\overline{STORE2}$ and $\overline{STORE3}$ are all low.

Similar to the minimum store group bus allocation arrangement, the multiple store group bus allocation arrangement eliminates lockouts by allowing only those devices having request signals in a particular store group to contend for bus access. All other request signals occurring after formation of that particular store group are denied access to that store group but possibly not to another store group to be formed subsequently. Thus, all devices having request signals in a particular store group are guaranteed access to the data bus with no possibility of being locked out.

We claim:

1. A store group resource allocation arrangement distributed among a plurality of devices for systematically controlling access of the devices to a common resource, the arrangement including means (101a), included in each of said devices, for generating a request signal (REQA), store group circuit means (202a), associated with each of said devices, responsive to the request signal for storing the request signal and for generating an arbitration enabling signal (ENABLA), and an arbiter (103) responsive to the arbitration enabling signal for generating a corresponding access grant signal (GRANTA) according to a prescribed criterion, the arrangement characterized by, a source of a clock signal having first and second states, and the store group circuit means associated with each of said devices being comprised of first memory means jointly responsive to the request signal and the clock signal for storing the request signal at a time instant corresponding to the coincidence of the presence of the request signal and the clock signal changing from the first state to the second state and for generating a first memory element output signal (EA-1) upon storage of the request signal in the first memory means, and second memory means jointly responsive to the request signal and the clock signal for storing the request signal at a time instant corresponding to the coincidence of the presence of the request signal and the clock signal changing from the first state to the second state and for generating a second memory element output signal (EA-2) upon storage of the request signal in the second memory means, the store group circuit means associated with each of said devices being further comprised of means responsive to the first and second memory element output signals from the store group circuit means associated with each device of the plurality of said devices for steering the request signal to the first memory means if no request signal is stored therein, and, alternatively, to the second memory means if a request signal is stored in the first memory means, and means (213) responsive to the first and second memory element output signals from the store group circuit means associated with each device of the plurality of said devices for selecting the first or second memory element output signal for transmission to the arbiter.

* * * * *